United States Patent
Talbot

(10) Patent No.: US 7,509,109 B2
(45) Date of Patent: *Mar. 24, 2009

(54) ADAPTIVE CORRECTION OF A RECEIVED SIGNAL FREQUENCY RESPONSE TILT

(75) Inventor: Daniel Talbot, Hudson, MA (US)

(73) Assignee: Ciena Corporation, Linthicum, MD (US)

( * ) Notice: Subject to any disclaimer, the term of this patent is extended or adjusted under 35 U.S.C. 154(b) by 588 days.

This patent is subject to a terminal disclaimer.

(21) Appl. No.: 11/222,480

(22) Filed: Sep. 8, 2005

(65) Prior Publication Data

US 2006/0019627 A1    Jan. 26, 2006

Related U.S. Application Data

(63) Continuation of application No. 10/197,623, filed on Jul. 16, 2002, now Pat. No. 6,968,170.

(51) Int. Cl.
*H04B 7/00* (2006.01)

(52) U.S. Cl. ............... 455/278.1; 455/295; 455/296; 375/232; 375/230; 375/235; 375/296; 375/297; 330/149; 331/17

(58) Field of Classification Search ......... 455/278.1, 455/295, 296; 375/232, 230, 235, 296, 297; 330/149; 331/17

See application file for complete search history.

(56) References Cited

U.S. PATENT DOCUMENTS

| 4,466,132 | A | 8/1984 | Namiki |
| 5,157,697 | A | 10/1992 | Anvari et al. |
| 5,495,502 | A | 2/1996 | Andersen |
| 5,559,830 | A | 9/1996 | Dapper et al. |
| 5,796,778 | A | 8/1998 | Kurker |
| 6,208,481 | B1 | 3/2001 | Spurbeck et al. |
| 6,240,149 | B1 | 5/2001 | Yukitomo et al. |
| 6,353,639 | B1 | 3/2002 | Prange et al. |
| 6,366,613 | B2 | 4/2002 | Sommer et al. |
| 6,934,341 | B2 * | 8/2005 | Sahlman ............... 375/297 |
| 2001/0043651 | A1 | 11/2001 | Nishimura et al. |
| 2003/0076176 | A1 * | 4/2003 | Fischer .................. 331/17 |
| 2003/0210093 | A1 | 11/2003 | Zhang |

FOREIGN PATENT DOCUMENTS

EP    0 998 028 A1    5/2000

* cited by examiner

*Primary Examiner*—Sanh D Phu
(74) *Attorney, Agent, or Firm*—Clements Bernard Miller; Christopher L. Bernard; Tyler S. Brown

(57) ABSTRACT

Distortion due to transmission characteristics of a transmission medium is corrected by measuring leakage in a signal orthogonal to a received signal. The frequency response of an equalizer is adaptively adjusted until the measured leakage is at a local minimum.

1 Claim, 9 Drawing Sheets

ADAPTIVE CORRECTION OF A RECEIVED SIGNAL FREQUENCY RESPONSE TILT

REFERENCE TO RELATED APPLICATIONS

This application is a continuation of U.S. patent application Ser. No. 10/197,623, filed Jul. 16, 2002, the entire contents of which are incorporated herein by reference.

BACKGROUND OF THE INVENTION

An amplitude modulated signal received over a transmission medium can be distorted due to transmission characteristics of the transmission medium, resulting in attenuation of the signal at different frequencies. A receiver typically includes an equalizer for compensating for the distortion due to the frequency response of the transmission medium. Ideally, the frequency response of the transmission medium should be flat; that is, the magnitude of the sidebands should be equal. However, the frequency response can be downward sloping or upward sloping dependent on frequency and phase distortion in the received signal due to the unequal magnitude of the sideband carriers. The frequency response of a filter in the equalizer is generally selected to approximate the inverse frequency response of the transmission medium in order to equalize or "flatten" the frequency response.

The characteristics of the transmission medium or the apparatus used to correct the received signal may vary with time or temperature. Thus, in that case, the frequency response of the equalizer must adapt to varying distortion in the received signal. The frequency response must be continuously measured and the inverse frequency response of the equalizer modified in response to changes in the measured frequency response. One known method for adaptively adjusting the inverse frequency response is to directly measure the frequency response of the transmission medium. However, prior art equalizers with adaptive frequency response based on direct measurement of the frequency response of the transmission medium require characterization of the medium for example, using test tones to "flatten" the frequency response. This may be technically inconvenient, if not impossible.

SUMMARY OF THE INVENTION

In the present approach, rather than measuring the frequency response directly, the orthogonal property of the received signal is used to measure total energy due to unequal magnitude of sideband carriers. A carrier is transmitted and periodically repeated. The carrier is transmitted and received but no signal orthogonal (i.e., lying at right angles) to the carrier is transmitted. Ideally, any orthogonal leakage signal should exhibit no observable energy. Any "leakage" energy that is observed is due to slope error (or delay error) caused by unequal magnitude (or delay) of sideband carriers. The "leakage" energy is measured directly from the leakage signal and the frequency response adjusted to minimize it.

In accordance with the present invention, a receiver has apparatus for adaptively minimizing distortion in a received modulated signal. The apparatus includes a leakage sensor for measuring leakage and an equalizer controller for modifying the frequency response based on the measured leakage. The leakage sensor provides a frequency response error based on leakage measured on a leakage signal orthogonal to the received modulated signal. The receiver also includes an equalizer having a frequency response. The frequency response is selected to minimize distortion in the received modulated signal. The equalizer controller coupled to the leakage sensor and the equalizer adjusts the frequency response of the equalizer in the receiver dependent on the frequency response error to minimize the measured leakage.

The frequency response error is a difference between currently measured leakage and previously measured leakage. The leakage sensor also includes a decision circuit. The decision circuit modifies the frequency response error provided by the leakage sensor to increase the rate at which the frequency response error is adjusted by the equalizer controller while the measured leakage is outside a first predetermined window. The leakage sensor includes a search limit establisher which modifies the frequency response error provided by the leakage sensor to increase the rate at which the frequency response error is adjusted by the equalizer controller while the measured leakage is outside a second predetermined window and the first predetermined window.

The received modulated signal may be an amplitude modulated signal. In an alternate embodiment, the amplitude modulated signal is one component selected from the I and Q components of a Quadrature Modulated signal and the leakage signal is the other component of the I and Q components. In a Quadrature Amplitude Modulation receiver, the leakage is measured during a periodic clock recovery interval.

The measured leakage may be the voltage, current or integrated power of the leakage signal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
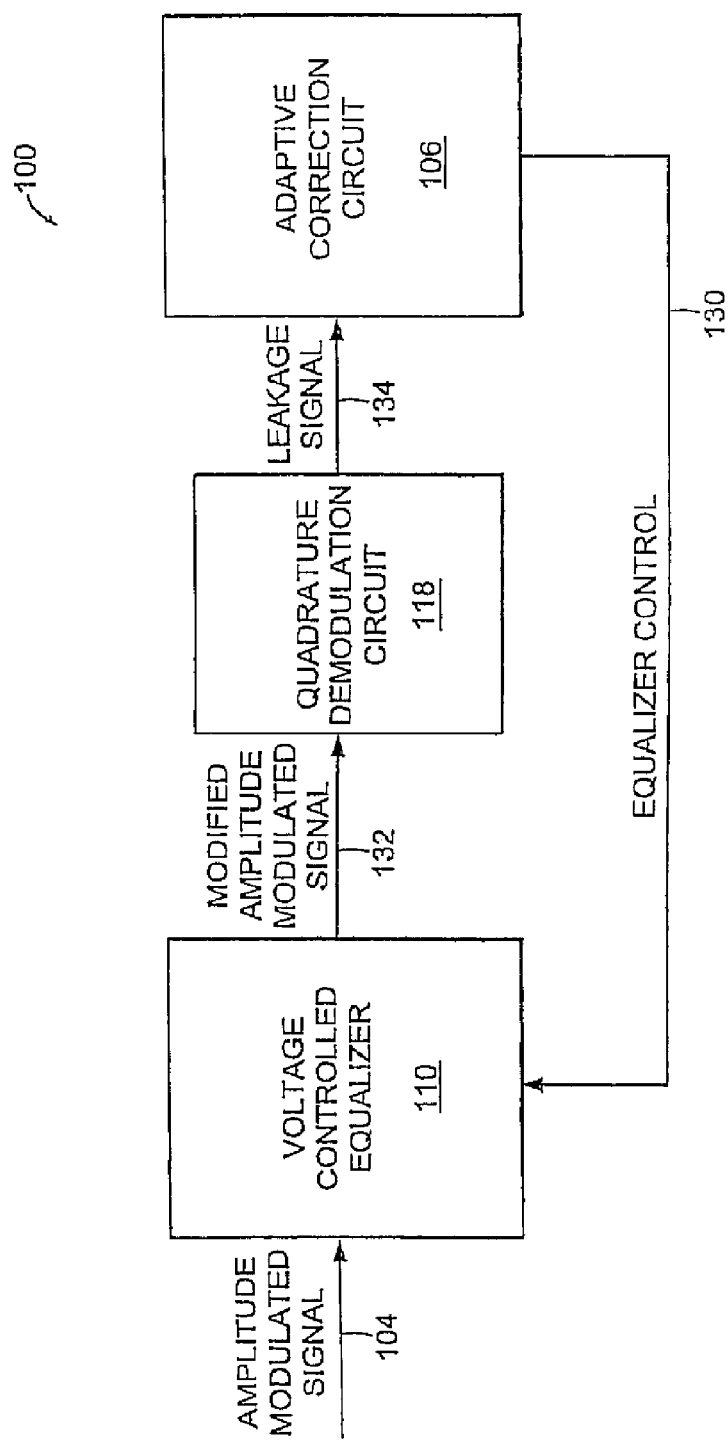
FIG. 1 is a block diagram of a receiver including a spectral slope-induced leakage sensor according to the principles of the present invention.

FIG. 1 is a block diagram of a receiver 100 including an adaptive correction circuit 106 according to the principles of the present invention. The adaptive correction circuit 106 measures "leakage" on the leakage signal 134. The "leakage" is an observable effect caused or induced by spectral slope. The spectral slope is any tilt in the frequency domain. For example, if viewed on a spectrum analyzer, the spectrum of a signal with spectral-slope-induced leakage is non-symmetrical in power around a mid-point in the frequency axis.

An amplitude modulated signal ("AM") 104 with distortion induced by channel impairments is processed by a voltage controlled equalizer 110. The voltage controlled equalizer 110 includes a filter having a frequency response selected to approximate the inverse frequency response of the transmission medium over which the AM signal 104 is being transmitted. The inverse frequency response selected is dependent on the voltage on the equalizer control signal 130.

If the inverse frequency response selected in the voltage controlled equalizer approximates the frequency response of the transmission medium, there is no distortion in the modified amplitude modulated signal 132 output from the voltage controlled equalizer 110. If there is distortion, the distortion results in "leakage" energy which can be measured in a signal orthogonal (lying at right angles) to the modified amplitude modulated signal 132.

For example, in a Quadrature Amplitude Modulation ("QAM") scheme, two axis are identified: I (for "in-phase") and Q (for quadrature). The I and Q axis are at a right angle (90°) from each other. The leakage can be measured by measuring the voltage, current or the integrated power of the leakage signal using methods well-known to those skilled in the art. The adaptive correction circuit 106 measures the leakage and modifies the voltage on the equalizer control signal 130 appropriately to minimize the leakage. The frequency response of the voltage controlled equalizer 110 can be continuously modified to minimize distortion in the modified amplitude modulated signal 132 by minimizing the measured leakage.

In a one-axis modulation scheme, such as standard AM radio, the quadrature "leakage" is an unwanted orthogonal signal which can be observed using a quadrature demodulation circuit 118. The quadrature demodulation circuit 118 is coupled to the voltage controlled equalizer 110 for receiving the modified amplitude modulated signal 132. The quadrature demodulation circuit 118 provides the leakage signal 134; that is, a signal orthogonal to the modified AM signal 132. The quadrature demodulation circuit 118 can be implemented as a Costas Loop. The Costas Loop is a Phase Lock loop which nulls the average D.C. voltage but not A.C. leakage. The A.C. leakage is a distorted version of the A.C. signal. The output 134 of the quadrature demodulation circuit 118 is leakage because no quadrature signal is required.

Figure 2A:
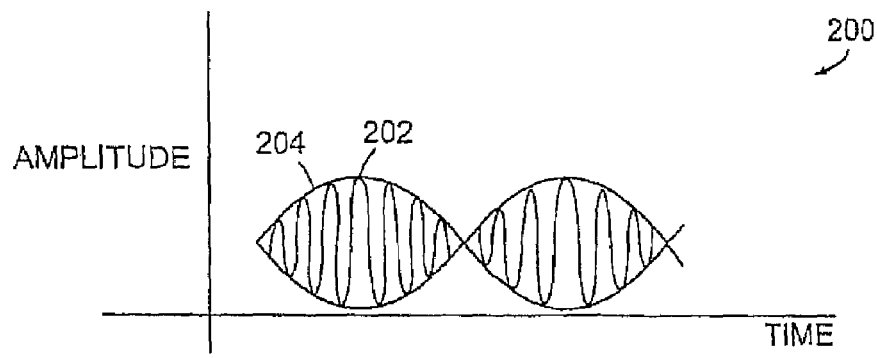
FIG. 2A is a graphical representation of an amplitude modulated signal.

FIG. 2A is a graphical representation of an amplitude modulated signal 200 received by the equalizer 110 (FIG. 1). The amplitude modulated signal 200 includes a carrier signal 202 with frequency $f_c$ and a modulating signal 204 with frequency $f_m$. The modulating frequency $f_m$ is lower than the carrier frequency $f_c$. In the amplitude modulated signal 200, the amplitude of the high frequency carrier 202 is controlled by the low frequency modulating signal 204.

Figure 2B:
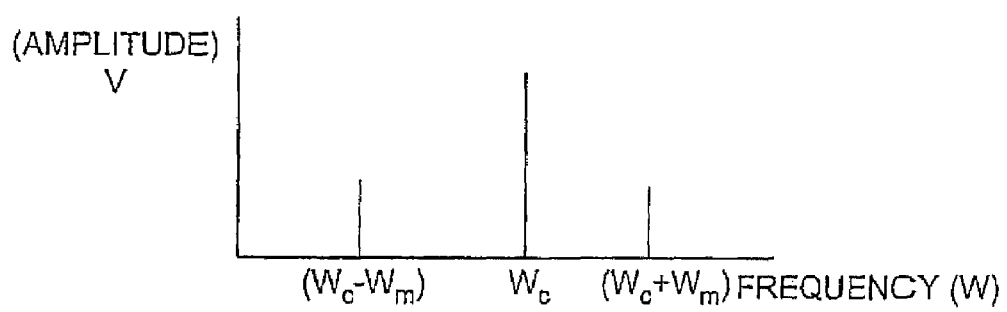
FIG. 2B is a graphical representation of the frequency spectrum domain for the amplitude modulated signal shown in FIG. 2A.

FIG. 2B is a graphical representation of the frequency spectrum domain for the amplitude modulated signal 200 shown in FIG. 2A. The frequency of the modulating signal ($f_m$) and the frequency of the carrier signal ($f_c$) are expressed in radians (w) where $w_c=2\pi f_c$. The frequency spectrum domain for the amplitude modulated signal 200 can be represented as the sum of three signals each having a different frequency; a carrier having frequency ($w_c$), an upper sideband having a frequency equal to the sum of the modulating frequency and the carrier frequency ($w_c+w_m$) and a lower sideband having a frequency equal to the difference between the carrier frequency and the modulating frequency ($w_c-w_m$). The amplitude of the upper sideband and the lower sideband is equal if there is no distortion in the amplitude modulated signal 200.

Figure 2C:
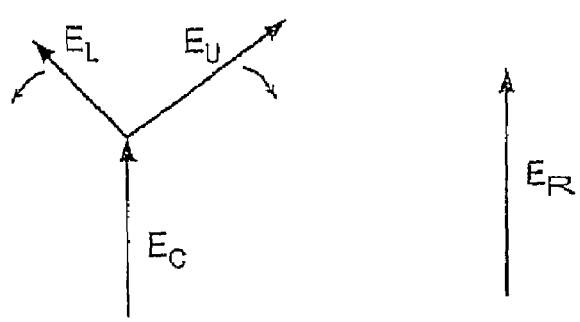
FIG. 2C is a phasor representation of the frequency spectrum domain shown in FIG. 2B.

Returning to FIG. 1, the adaptive correction circuit 106 is coupled to the quadrature demodulation circuit 118 for receiving the leakage signal 134. The amplitude of the leakage signal 134 is related to the frequency response error in the voltage controlled equalizer 110. The dependency can be shown by representing the carrier and sidebands in the modified AM signal 132 shown in FIG. 2B as phasors. FIG. 2C is a phasor representation of the frequency spectrum domain shown in FIG. 2B. The carrier with frequency $w_c$ is represented as phasor $E_c$. The lower sideband ($w_c-w_m$) is represented as phasor $E_L$ and the upper sideband ($w_c+w_m$) is represented as phasor $E_u$. The $E_u$ and $E_L$ sideband phasors counter-rotate while the carrier phasor $E_c$ is stationary and the magnitude of the carrier phasor $E_c$ remains constant. If there is no distortion, both sideband phasors $E_u$ and $E_L$ have the same amplitude and retain the same phase difference producing a resultant phasor $E_R$ parallel to carrier phasor $E_c$. The amplitude of the resultant phasor $E_R$ varies dependent on the phase difference between sideband phasors $E_u$ and L.

Phasor $E_R$ can be represented as a complex number with a real and an imaginary component. The real-component of the complex number is the attenuated magnitude observed on the modified AM signal 132 (FIG. 1). The imaginary-component of the complex number can be observed on the leakage signal 134 (FIG. 1) that is phase shifted by 90 degrees from the modified AM signal 132 (i.e. orthogonal to the modified AM signal.) The relationship between the modified AM signal 132 (FIG. 1) and the leakage signal 132 (FIG. 2) is shown below:

$$e^{jwct}=\cos w_c t + j \sin w_c t$$

Where:
$e^{jwct}$ is a counterclockwise rotating phasor of unit length;
cos $w_c t$ represents the real part (projected on the x axis) and corresponds to the modified AM signal; and
sin $w_c t$ represents the component orthogonal to the modified AM signal and corresponds to the leakage signal.

Figure 2D:
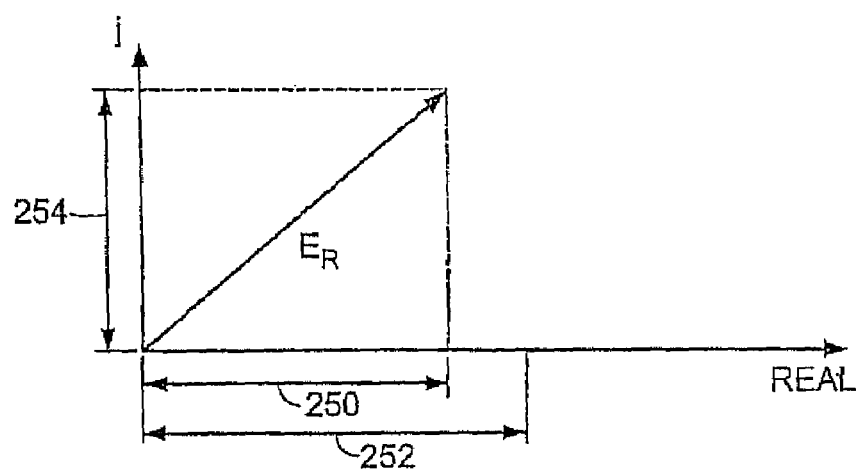
FIG. 2D is a graphical representation of a phasor resulting from the combination of the phasors shown in FIG. 2C when there is phase or amplitude distortion between the sideband phasors.

When phasors $E_U$ and $E_L$ are equal, the component orthogonal to the received signal is zero. FIG. 2D is a graphical representation of phasor $E_R$ after combining the unequal phasors $E_L$ and $E_U$ shown in FIG. 2C. Due to the unequal amplitude of phasors $E_U$ and $E_L$, phasor $E_R$ has a component orthogonal to the received signal 254. The received signal 250 is the projection on one axis, the component orthogonal to the received signal 254 is the projection onto the other (j) axis. With no distortion, the component orthogonal to the received signal is zero. A component with non-zero amplitude orthogonal to the received signal reduces the amplitude of the received signal. As shown, the amplitude of received signal 250 with a non-zero component orthogonal to the received signal 254 is smaller than received signal 252 with no component orthogonal to the received signal. The amplitude of the component orthogonal to the received signal is related to the distortion in the received signal.

Thus, the frequency response error in the equalizer 110 (FIG. 1) is related to the amplitude of the leakage signal 134 (FIG. 1). By minimizing the amplitude of the leakage signal 134 (FIG. 1), the frequency response error is minimized and distortion in the modified AM signal 132 is minimized.

Figure 3A:
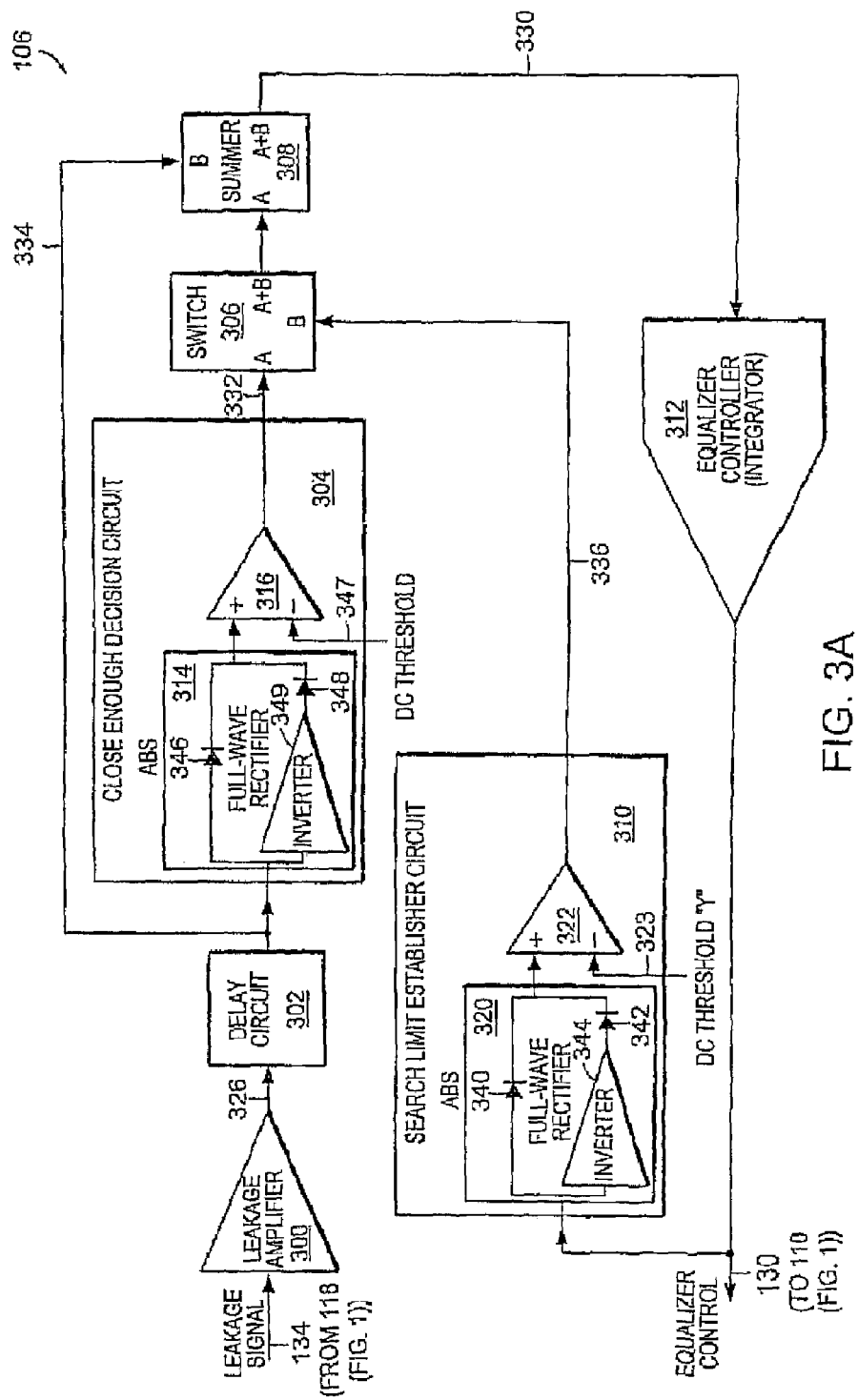
FIG. 3A is a block diagram of an embodiment of the adaptive correction circuit shown in FIG. 1.

FIG. 3A is a block diagram of an embodiment of the adaptive correction circuit 106 shown in FIG. 1. The adaptive correction circuit 106 includes an equalizer controller 312 and a spectral-slope-induced leakage sensor. The spectral-slope-induced leakage sensor computes a frequency response error 330 based on leakage measured on the leakage signal 134. The spectral-slope-induced leakage sensor includes a leakage amplifier 300, a delay circuit 302, close enough decision circuit 304, search limit establisher circuit 310, a switch 306 and a summer 308. The equalizer controller 312 modifies the voltage on the equalizer control signal 130 dependent on the frequency response error 330.

The leakage signal 134 is amplified by the leakage amplifier 300 so that the leakage can be detected. The leakage amplifier 300 can be any AC amplifier having sufficient gain to amplify the leakage signal 134 so that it can be used by the delay circuit 302. As the distortion in the modified amplitude signal 132 (FIG. 1) is minimized, the amplitude of the leakage signal 134 decreases close to zero. The gain of the leakage amplifier 300 is selected to peak near the highest data modulation frequency sidebands because the highest data modulation frequency sidebands are the sidebands most likely to be affected by a non-flat frequency response slope in the voltage controlled equalizer 110 (FIG. 1). In an alternate embodiment, the leakage amplifier 300 may not be required, if the delay circuit 302 is sufficiently sensitive to a low amplitude leakage signal.

The leakage amplifier 300 is coupled to the delay circuit 302. The delay circuit measures the leakage due to the frequency response error. The delay circuit 302 receives the amplified leakage signal 326 and compares the amplitude to a previously measured (stored) amplitude on the amplified leakage signal 326, in order to determine if the leakage is increasing or decreasing after each subsequent measurement. The amplitude at the output of the delay circuit 302 determines the direction (increase or decrease) in which the amplitude on the equalizer control signal 130 must be modified to correct the frequency response slope and minimize the distortion. The delay circuit 302 computes the "numerical difference" between the current leakage amplitude and the stored leakage amplitude.

Figure 3B:
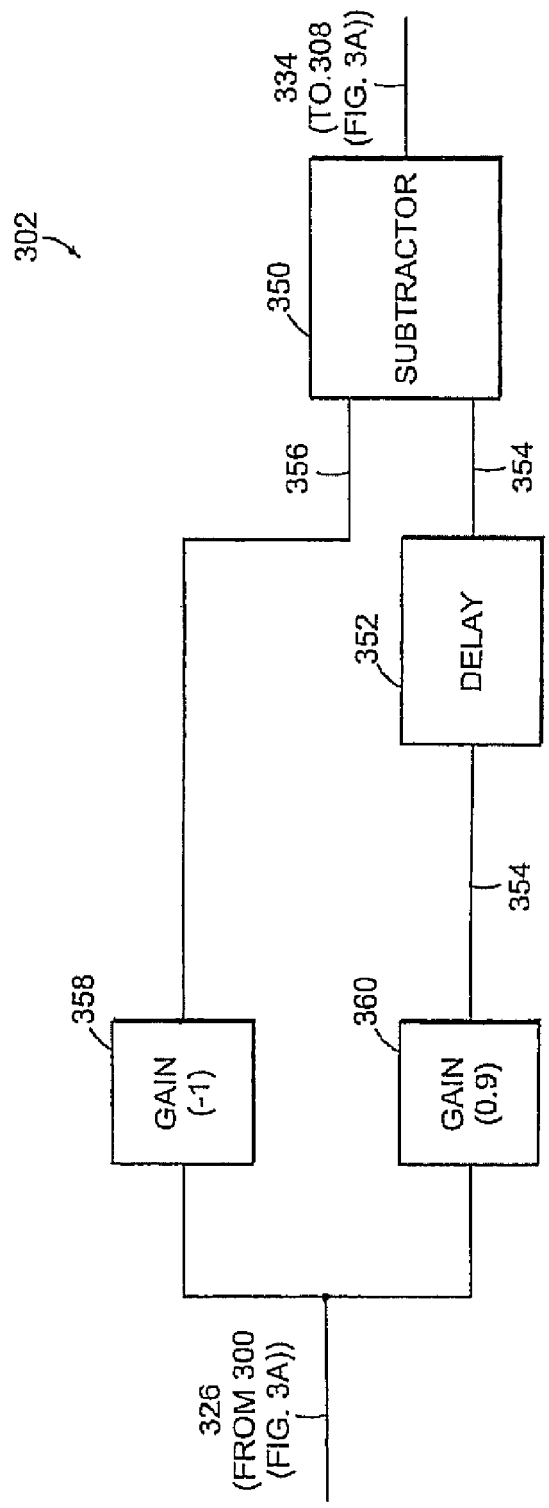
FIG. 3B is a block diagram of an embodiment of the delay circuit shown in FIG. 3A.

FIG. 3B is a block diagram of an embodiment of the delay circuit 302 shown in FIG. 3A. The delay circuit 302 includes a subtractor 350 and a delay 352. The delay 352 is the time between measurements. The "leakage" is stored by passing the amplified leakage signal 326 through the delay 352. In the embodiment shown, a gain of 0.9 is applied to the stored leakage 354 and a gain of −1 is applied to the amplified leakage signal 326. The stored leakage 354 is compared with the current leakage in the subtractor 350 to compute the "numerical difference". The delayed path gain is unbalanced compared to the direct path so that a non-zero numerical difference is output even when there is no difference between the current leakage and the stored leakage, so that the adaptive correction circuit 106 continuously monitors the leakage. The unbalance of the gain in the embodiment shown is 10% (−1+ 0.9). As noted above, the numerical difference is used to determine the direction in which the control voltage 130 should be modified to minimize distortion in the modified amplitude modulated signal 132 by minimizing the measured leakage in the leakage signal 134. In the embodiment shown, the stored leakage and current leakage is a voltage. However, in alternate embodiments, the leakage can be current, power or a numerical value.

Returning to FIG. 3A, the output of the delay circuit 302 is coupled to the close enough decision circuit 304. The close enough decision circuit 304 is a symmetrical window comparator and includes a full-wave rectifier 314 and a comparator 316. The full wave rectifier 314 includes two diodes 346, 348 and an inverter 349. The full wave rectifier 314 provides a D.C. level voltage from the A.C. voltage on the output 334 of the delay circuit 302.

The full-wave rectifier 314 is coupled to comparator 316. Comparator 316 compares the D.C. voltage output by the full-wave rectifier 314 with a D.C. threshold voltage 347. The close enough decision circuit 304 indicates whether the numerical difference is "close enough"; that is, inside a predetermined voltage range. If the numerical difference is inside the predetermined voltage range or window, the voltage on the equalizer control voltage signal 130 is "close enough" to the voltage required to minimize distortion. Further reduction of the distortion is not necessary. For example, the window can be selected so that the "close enough" value reduces the leakage signal to eliminate 90% of the distortion.

In one embodiment, the output of the close enough decision circuit 304 toggles between 0V and 1V. The output switches to 1V when the input voltage increases above 0.1625V and switches to 0V when the input voltage decreases below 0.15V. Thus, output of the close enough decision circuit 304 remains at 0V while the voltage on the output 334 of the delay circuit 302 is below the threshold voltage of 0.15V, that is, while the distortion is about 10%. While the output of the close enough decision circuit 304 is 0V, the magnitude of the frequency response error 330 is the same as the magnitude of the leakage signal 334 coupled through the summer. While the output of the close enough decision circuit 304 is 1V, the magnitude of the frequency response error 330 is increased by 1V.

The search limit establisher circuit 310 is a symmetrical window comparator. In the embodiment shown, the symmetrical window comparator includes a full-wave rectifier 320 and comparator 322. The operation of the search limit establisher circuit 310 is the same as already discussed for the close enough decision circuit 304.

The output of the close enough decision circuit 304 is coupled to the A-input of a switch 306. If the numerical difference is not "close enough", the 1V on the output of the close enough decision circuit 304 closes the switch 306, allowing the output of the search limit establisher circuit 310 to be superimposed on the delay circuit output 334. The search limit establisher circuit 310 is switched in to establish a search limit.

The output 336 of search limit establisher circuit 310 is a D.C. voltage much larger than the voltage on the output of the delay circuit 302. The D.C. voltage at the output of switch 306 is summed with the output 334 from the delay circuit 302 in the summer 308. The large D.C. voltage on the output 330 of the summer 308 input to the equalizer controller 312 causes the equalizer controller 312 to ramp ("slew").

The large D.C. voltage is applied to the equalizer controller 312 in a sustained manner in order to keep the equalizer controller 312 slewing by providing hysteresis in the search limit establisher circuit 310. In one embodiment, the trigger points of the search limit circuit 310 are ±0.5V and the output of the search limit establisher circuit 310 is ±8V. The trigger points cause the equalizer controller ramp to reverse direction if the input voltage is ±0.5V. There is a large hysteresis of ±0.5V. If the control voltage moves outside this ±0.5V window, the output of the search limit establisher circuit 310 switches voltage level to provide either +8V or −8V at the input of the equalizer controller.

Thus, a D.C. voltage of ±8V is applied to the input to the equalizer controller 312 while the numerical difference output 334 from the delay circuit 302 is outside the window established by the close enough decision circuit 304.

Once the numerical difference output 334 of the delay circuit 302 is within the window defined by the close enough decision circuit 304, the output of the close enough decision circuit 304 switches to 0V. The 0V at the A input of the switch 306 opens the switch 306. While switch 306 is open, the output of the search limit establisher circuit 310 is decoupled from the equalizer controller. However, the output of delay circuit 302 remains coupled to the equalizer controller 312 through the B input of summer 308. As discussed, in the delay circuit 302, the stored leakage and the current leakage are amplified by different gain values. Thus, even when the "leakage" is minimized there is still a non-zero voltage at the output of the delay circuit 302 which is provided to the input of the equalizer controller 312. This small voltage allows the leakage to be continuously monitored so that the leakage signal can be continuously polled to detect when the distortion increases above 10%.

The equalizer controller 312 can be implemented as a linear integrator (analog integrator) or a non-linear integrator (digital integrator). For example, the digital integrator can be implemented as an up-down counter with a plurality of voltage steps corresponding to the count value. In an alternate embodiment, the equalizer controller can be implemented as a hunt-and-seek algorithm using successive approximation. The algorithm monitors divergence of the frequency response error and reverses the direction of the equalizer control upon detecting divergence. In the embodiment shown, the equalizer controller is an analog integrator and the output voltage is linear as shown in FIG. 5.

Figure 4:
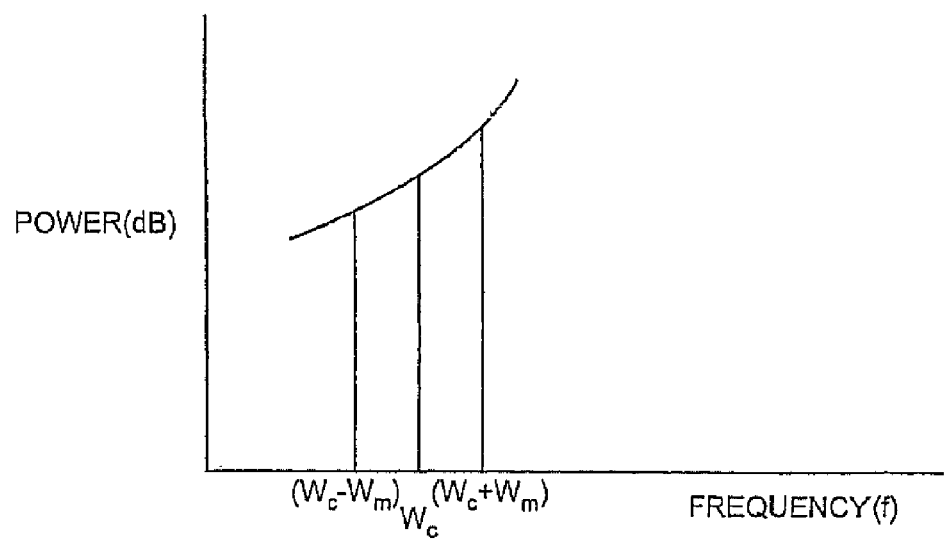
FIG. 4 is a graphical representation of power versus frequency illustrating an upward frequency response tilt for the phasor representation of the frequency domain shown in FIG. 2B.

The voltage of the leakage signal 104 is related to the slope of the frequency response in the equalizer 110. FIG. 4 is a graphical representation of power (dB) versus frequency illustrating an upward frequency response tilt for the phasor representation of the frequency domain shown in FIG. 2B. As shown, the upper sideband power is greater than the lower sideband power, indicating a frequency response tilt with a positive slope.

An embodiment of the invention has been described for an AM signal. However, the invention is not limited to Amplitude Modulation. The invention can also be used to minimize distortion in any orthogonal modulation scheme, for example, DQPSK (Differential Quadrature Phase. Shift Keying), QPSK (Quadrature Phase Shift Keying), QAM (Quadrative Amplitude Modulator), 9QPR (9-point Quadrative Partial-Response Modulator), 16QAM, 256QAM and Phase Modulation.

Figure 5:
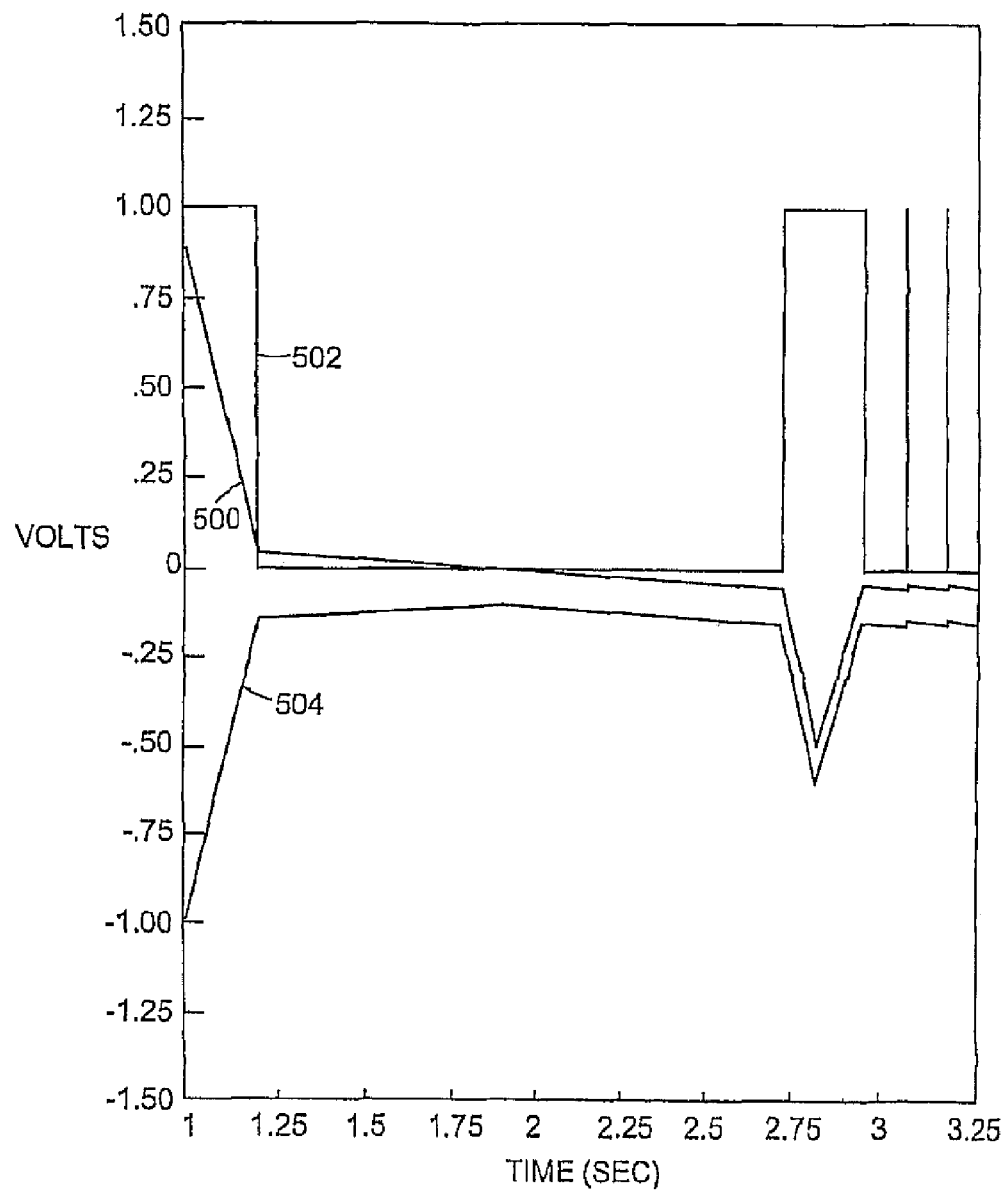
FIG. 5 is a plot illustrating measured traces in the embodiment of the spectral-slope-induced leakage sensor shown in FIG. 3A.

FIG. 5 is a plot illustrating measured traces in the embodiment of the spectral-slope-induced leakage sensor 106 shown in FIG. 3A. Three traces are shown. Trace 500 corresponds to the voltage of the equalizer control signal 130 at the output of the equalizer controller 312. Trace 502 corresponds to the close enough signal 332 at the output of the close enough decision circuit 304. Trace 504 corresponds to the output 334 of the delay circuit 302.

As shown, trace 504 is −1V at time=1 second, indicating a change in leakage signal detected by the delay circuit 302 requiring modification of the equalizer control signal voltage. The −1V results in switching the output of the close enough decision circuit (trace 502) to 1V. Trace 502 remains at 1V until the output of the delay circuit 302 shown on trace 504 decreases below −0.15V as the equalizer control signal voltage decreases as shown on trace 500.

Once the delay circuit output voltage (trace 504) decreases below 0.15V, the output of the close enough decision circuit 304 (trace 502) switches to 0V. The 0V on the A input to the switch 306 acts to "disconnect" the search circuit limit establisher circuit 310 from the feedback loop by multiplying the output of the search circuit limit establisher 310 by 0. The output of the search circuit limit establisher circuit 310 remains at the same state while the search circuit limit establisher circuit is disconnected.

The output 334 of the delay circuit 302 is coupled to the summer 308. Thus, any change in the voltage on the leakage signal 134 results in a corresponding change in the input voltage to the equalizer controller 312. The change in the input voltage results in a corresponding change in the equalizer control signal voltage 130 at the output of the equalizer controller 312.

A decrease in the equalizer control voltage 130 at the output of the equalizer controller 312 results in a corresponding decrease in the voltage on the delay circuit output 334. At 2.75 seconds, the voltage on the delay circuit output 334 reaches the hysteresis trigger point of single sided comparator 316, resulting in 1V on the close enough decision circuit output 332. The 1V opens the switch 306 and the voltage on the output of the search limit establisher 310 controls the voltage on the equalizer controller input 330.

The search limit establisher output 336 decreases the equalizer control voltage in a negative direction until the hysteresis trigger point for the search limit establisher 310 is reached. As shown, at 2.85 seconds, the hysteresis trigger point is reached and the equalizer control voltage starts to increase in the positive (correct) direction. Equalizer control voltage 500 continues to increase until the close enough decision circuit output 332 switches to 0V and the search circuit limit establisher 310 is "disconnected" from the feedback loop controlling the equalizer controller input voltage 330.

The search circuit limit establisher output 336 is now in the correct state and is connected as needed to increase the control voltage to overcome the steady state positive bias caused by the delay circuit 302. The search circuit limit establisher output 336 is only connected briefly as shown by the positive spikes on the timing diagram because the search circuit limit establisher output is the correct polarity; that is, negative.

In an alternate embodiment, if the search circuit limit establisher output 336 is initially negative, the equalizer control voltage remains positive, eliminating the negative spike at 2.75 seconds.

The 0V on the output of the close enough decision circuit 304 results in a small decrease in the equalizer control voltage. At 2.7 seconds, the equalizer control voltage decreases to a voltage level resulting in an increase in the delay circuit voltage 334 and the output of the close enough decision circuit 304 switches to 1V until the delay circuit output 334 decreases below 0.15V.

The equalizer control voltage 130 continues to change to provide a difference in the delay circuit 302 to allow adjustment of the equalizer control voltage 130 to reduce the distortion. Positive feedback exists around the loop, which creates a "flip-flop" behavior outside the hysteresis window (0.1625V-0.15V).

As discussed in conjunction with FIG. 3B, there is an unbalance in the delay circuit 302 due to the unequal gain in the stored leakage and the current level of leakage. When the leakage is minimized, the 0.15V on the output of the delay circuit 302 results in 0.75V at the input of the equalizer controller 312. Thus, the equalizer controller output (equalizer control) will increase resulting in the delay circuit output voltage 334 greater than 0.15V. In the embodiment shown, the equalizer controller is an analog integrator. A very small "hunting" results as shown by the positive pulses on trace 502. The hunting can be reduced by replacing the analog integrator with a digital integrator or by implementing a non-linear integrator in software.

Figure 6:
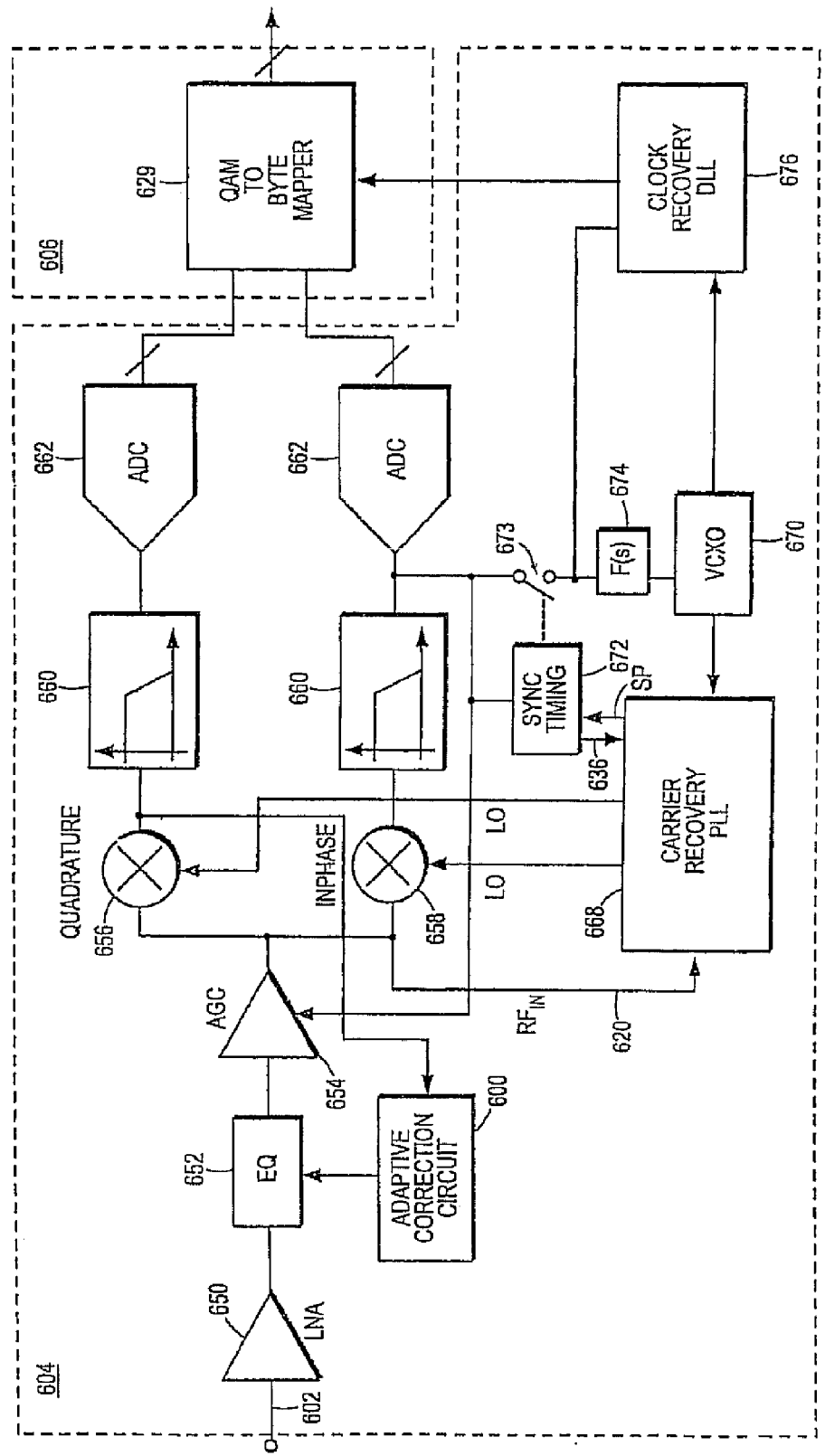
FIG. 6 is a block diagram of a QAM receiver including the adaptive correction circuit according to the principles of the present invention.

FIG. 6 is a block diagram of a QAM receiver 604 including the adaptive correction circuit 600 according to the principles of the present invention. The QAM receiver 604 is described in U.S. patent application Ser. No. 09/952,321 filed Sep. 13, 2001 entitled "Broadband System With Topology Discovery", by Gautam Desai, et al, the entire teachings of which are incorporated herein by reference.

The receiver 604 receives a quadrature-multiplexed signal 602 which includes in-phase (I) and quadrature (Q) carriers. At the front end, the receiver 604 includes low-noise amplifier (LNA) 650, equalizer 652 and automatic gain control (AGC) 654. The received signal 602 is boosted in the LNA 650 and corrected for frequency-dependent line loss in the equalizer 652. The equalized signal is passed through the AGC stage 654 to I and Q multiplier stages 656, 658, low pass filters 660 and analog-to-digital converters (ADC) 662. After down-conversion in the multiplier stages 656, 658 and low-pass filtering, the I and Q channels are digitized and passed on to the QAM-to-byte mapper 629 for conversion to a byte-wide data stream.

Carrier and clock recovery, for use in synchronization at symbol and frame levels, are performed during periodic training periods. A carrier recovery PLL circuit 668 provides the I and Q carriers from the RF carrier (RFin) 620 to the multipliers 656, 658. The RF carrier 620 includes the I and Q carriers. A clock recovery delay locked loop (DLL) circuit 676 provides a clock to the QAM-to-byte mapper 649. During each training period, to perform carrier and clock recovery, PLL and DLL paths that include F(s) block 674' and voltage controlled oscillator (VCXO) 670 are switched in using normally open switch 673 under control of SYNC timing circuit 672 in order to provide updated samples of phase/delay error correction information.

In the embodiment shown, only the I carrier is transmitted during the training period. With no distortion, the measured leakage on the Q carrier orthogonal to or in quadrature with the I-signal is close to zero. After the carriers have been recovered by the carrier recovery PLL 668, the adaptive correction circuit 600 measures the leakage on the Q carrier. The frequency response of the equalizer 652 is modified to minimize leakage on the Q carrier and thus, minimize the distortion. In an alternative embodiment, the Q carrier is transmitted during the training interval and the leakage on the I carrier is measured and minimized after the carriers have been recovered.

Figure 7A:
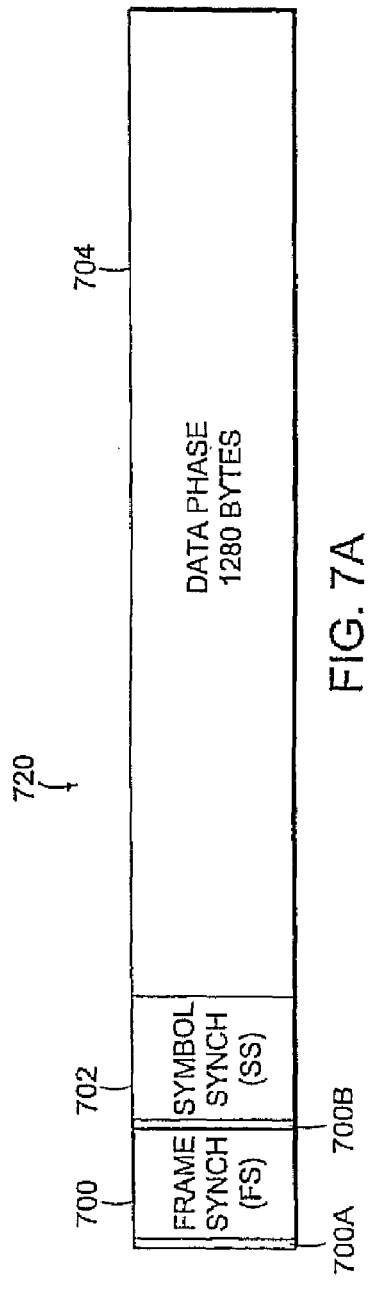
FIG. 7A is a block diagram of a frame structure for use in the QAM receiver of FIG. 6.

FIG. 7A is a block diagram of a frame structure 720 for use in the QAM receiver 604 of FIG. 6. The frame structure 720 is used to transmit a frame over the network. The frame structure 720 includes frame synchronization (or carrier synchronization) 700; symbol synchronization 702 and a data phase 704. In a particular embodiment, frame and symbol synchronization is performed every 10 micro seconds (μs) followed by 1280 bytes of Data Phase 721, with frame synchronization (FS) 600 for 1 micro second (μs) and the symbol synchronization (SS) 702 for 400 nano seconds (ns). There is a quiet interval before and after the frame synchronization 700. The quiet interval before the frame synchronization is referred to as the front porch 700A frame and the quiet time after the frame synchronization is referred to as the back porch 700B. The front porch 700A and back porch 700B provide sufficient time for closing or opening a switch, for example, switch 673 (FIG. 6) at the beginning and end of the frame synchronization 700 period. In one embodiment the front and back porches are about 300 ns for a frame synchronization period of about 1 μs. It should be understood that other frame structures are possible and the frame structure described is only an example.

During the frame synchronization period 700, the carrier recovery PLL 668 recovers the I carrier. After the I carrier is recovered, the leakage on the Q carrier is measured during the symbol synchronization period 702, to minimize distortion in the recovered carrier.

Figure 7B:
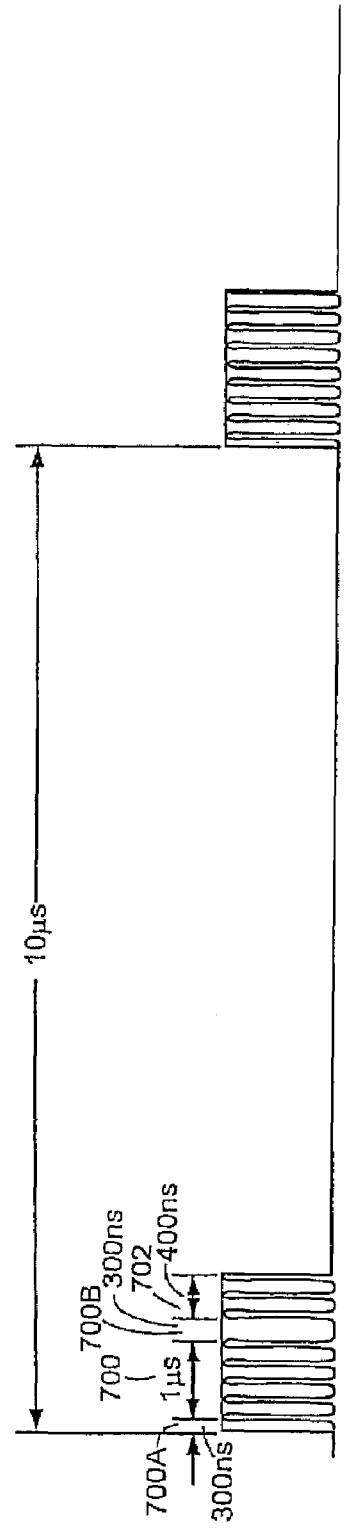
FIG. 7B illustrates an example of modulation of a carrier frequency using the frame structure shown in FIG. 7A.

FIG. 7B illustrates an example of modulation of a carrier frequency using the frame structure shown in FIG. 7A. An adaptive correction circuit 600 (FIG. 6) uses the orthogonal property of the received QAM signal to measure the frequency response. During training intervals, a carrier is transmitted and periodically repeated. As discussed in conjunction with FIG. 7A, in a particular embodiment, symbol synchronization can be performed every 10 μs for 400 ns. During symbol synchronization, the carrier is transmitted only on the in-phase (I) or the quadrature (Q) channel, but not both. The other channel 'Q' or 'I' should exhibit no observable energy. Any energy observed on the other channel is due to frequency response error.

The I and Q modulation is interrupted once every 10 μs so that the receiver can be synchronized to the transmitter. The frame synchronization period 700 is used to recover the carriers. During the symbol synchronization period 702 after the carriers have been recovered a 155.52 MHz A.C. signal is received on'the I channel. The symbol synchronization period is used to measure leakage in the Q carrier. The synchronization includes carrier, symbol and bit rate synchronization. The repetitive interruption of the symbol synchronization every-10 us creates 100 KHz sidebands as discussed in conjunction with FIG. 2B. The 100 KHz sidebands are symmetric around 155.52 MHz. Thus, any leakage in the Q channel due to distortion in the I channel also includes the 100 KHz sidebands. The leakage is measured on the Q channel after the carrier recovery PLL 468 (FIG. 6) is locked; that is, after the carriers have been recovered.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for adaptively minimizing distortion in a received modulated signal in a receiver, the apparatus comprising:
   a leakage sensor which provides a frequency response error based on leakage measured on a leakage signal orthogonal to the received modulated signal; and
   an equalizer controller coupled to the leakage sensor which adjusts the frequency response of an equalizer in the receiver dependent on the frequency response error to minimize the measured leakage;
   a delay circuit measuring a difference between the measured leakage and a stored measured leakage;
   a decision circuit determining whether the difference is inside a first predetermined window operable to minimize the measured leakage; and
   a search limit circuit modifying the frequency response error to increase adjustment of the frequency response error if the measured leakage is outside a second predetermined window and the first predetermined window.

* * * * *